W. D. ROOT AND C. E. HELMICK.
WATER MOTOR.
APPLICATION FILED MAR. 8, 1921.

1,434,264.

Patented Oct. 31, 1922.

Waldo D. Root,
Clarence E. Helmick,
INVENTOR

BY Victor J. Evans
ATTORNEY

WITNESS:

W. D. ROOT AND C. E. HELMICK.
WATER MOTOR.
APPLICATION FILED MAR. 8, 1921.
1,434,264.
Patented Oct. 31, 1922.
3 SHEETS—SHEET 2.
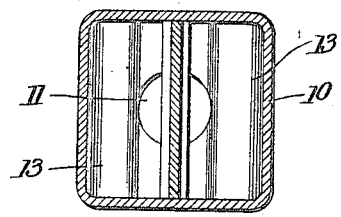
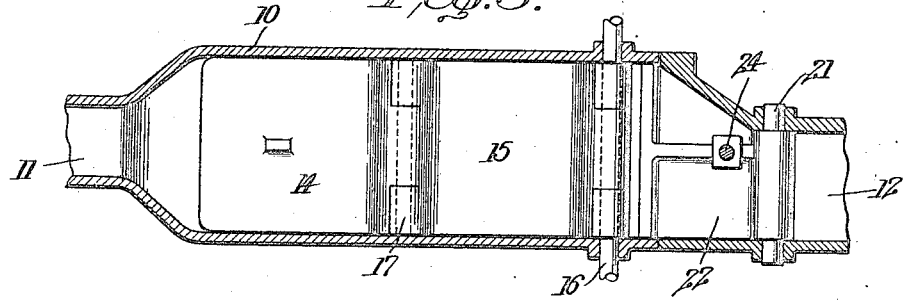
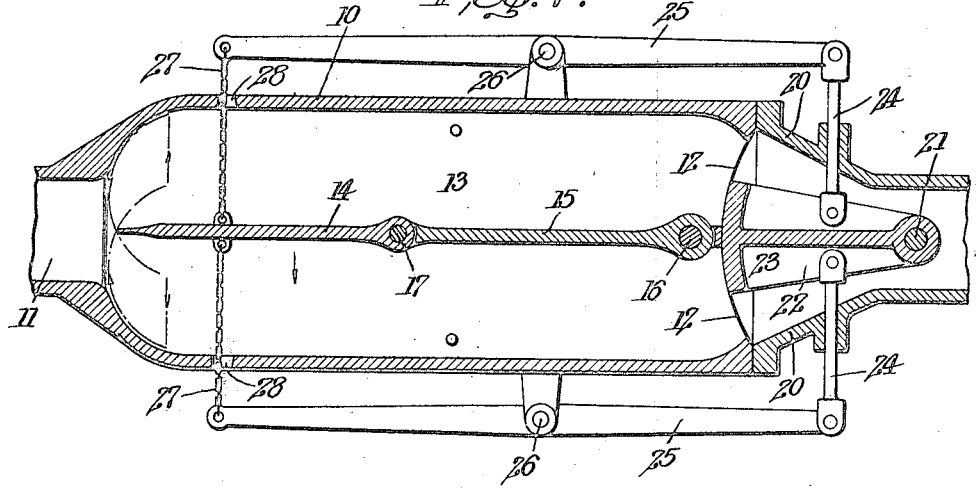
Waldo D. Root,
Clarence E. Helmick,
INVENTOR
BY Victor J. Evans
ATTORNEY
WITNESS:

Patented Oct. 31, 1922.

1,434,264

UNITED STATES PATENT OFFICE.

WALDO D. ROOT AND CLARENCE E. HELMICK, OF PLEASANT VALLEY, OREGON; SAID ROOT ASSIGNOR TO SAID HELMICK.

WATER MOTOR.

Application filed March 8, 1921. Serial No. 450,548.

*To all whom it may concern:*

Be it known that we, WALDO D. ROOT and CLARENCE E. HELMICK, citizens of the United States, residing at Pleasant Valley, in the county of Baker and State of Oregon, have invented new and useful Improvements in Water Motors, of which the following is a specification.

This invention relates to improvements in water motors and has for an object the provision of a motor which will produce a maximum amount of power from a given supply of water.

Another object of the invention is the provision of a water motor which utilizes the irregular action of water for preventing a motor from remaining upon a dead center, thus rendering the operation of the motor positive and reliable, as there is no position of the parts from which the motor will not automatically start under the action of water passing therethrough.

Another object is the provision of a water motor in which the water is held a sufficient length of time to obtain a maximum amount of efficiency, loss of power being further prevented by the elimination of all back pressure.

A further object is the provision of a water motor which is exceedingly simple of construction, its structure being such that it will not easily get out of repair, thus further insuring its positive and reliable operation, while in addition, it will operate for an indefinite period with a minimum amount of attention.

With the above and other objects in view, the invention further includes the following novel features and details of construction, to be hereinafter more fully described, illustrated in the accompanying drawings and pointed out in the appended claims.

In the drawings:—

Figure 5 is a central vertical longitudinal sectional view of the motor.

Figure 6 is a transverse section.

Figure 7 is a horizontal section showing the blades in a central position, or upon dead center.

Figure 8 is a similar view with the blades at the end of the stroke.

Figures 9 and 10 are diagrams showing the various intermediate positions of the blades during the operation of the motor.

Figure 1:
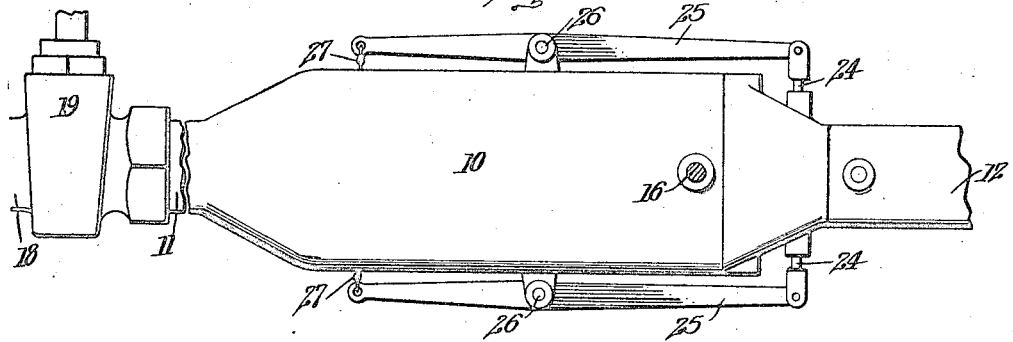
Figure 1 is a plan view of a water motor constructed in accordance with the invention.
Figure 2:
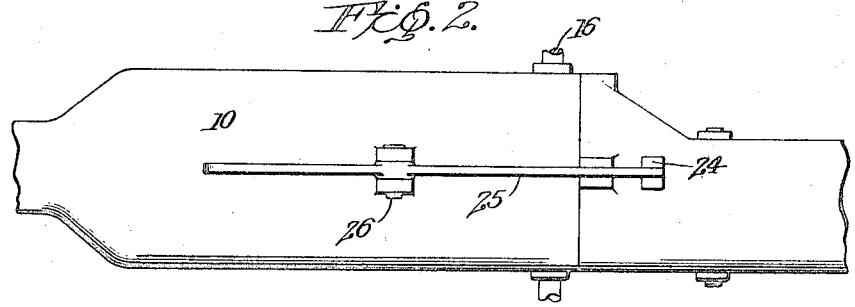
Figure 2 is a side elevation of the same.
Figure 3:
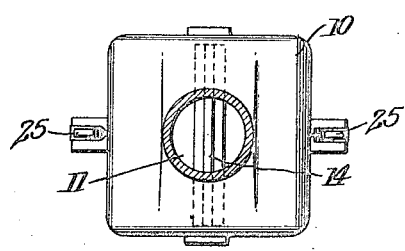
Figure 3 is an elevation looking at the intake end of the motor.
Figure 4:
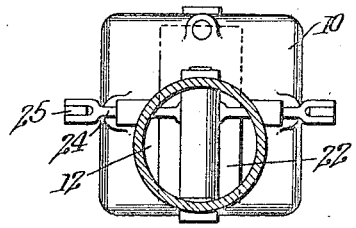
Figure 4 is a similar view looking at the exhaust end.

Referring to the drawings in detail, wherein like characters of reference denote corresponding parts, the reference character 10 indicates a casing, having an inlet port 11 at one end and exhaust ports 12 at the opposite end. This casing is divided into separate water chambers 13, by means of a movable partition, the latter being in the form of a pair of horizontally swinging blades 14 and 15, which will be hereinafter designated respectively as the reversing blade and the power blade. The power blade 15 is secured at one end upon a shaft 16 and its opposite end is pivotally connected to the inner end of the reversing blade 14 as shown at 17, while the free end of the last mentioned blade operates across the entrance opening 11 and serves to direct the water passing through this entrance to either of the water chambers 13. Water may be supplied to the intake port 11 by means of a pipe or other conduit 18, which is controlled by a valve 19, the said valve acting as a throttle to regulate the speed of the motor.

The inlet opening 11 and the exhaust openings 12 are each of substantially the same area and the last named openings have extending therefrom flanges 20 which act to direct the water passing from the exhaust to the conduit or other suitable means of disposal.

Mounted centrally of the casing upon a pivot 21 is a valve 22 which is adapted to control the exhaust openings 12 and for this purpose the inner face of this valve is of arcuate formation as shown at 23, while its width is such as to extend entirely across either of the exhaust openings. This valve has pivotally connected thereto upon opposite sides, the inner ends of links 24, while the outer ends of these links are pivotally connected to the adjacent ends of levers 25. These levers 25 are pivotally mounted as shown at 26 upon the outside of the casing 10 and their forward ends are connected by chains 27 with the reversing blade 14, the said chains passing through openings 28 provided in the opposite side walls of the casing.

In the operation of the invention, assuming that the blades are in the position shown in Figure 7, water entering the chamber through the inlet opening 11 will cause the reversing blade 14 to move to one side or the other of the center of this opening, this movement being due to the irregular action of the water. Should the blade move in the direction of the arrow shown in Figure 7, further action of the water will cause the juncture of the blades 14 and 15 to reach approximately the adjacent side of the casing 10, moving the free end of the reversing blade 14 over to the opposite side of the entrance opening 11. Water passing through this opening will then be deflected into the opposite water chamber, moving the blades 14 and 15 in an opposite direction and through the connection 27 of the reversing blade with one of the levers 25, cause the valve 23 to swing upon its pivot and close the exhaust opening 12 of this water chamber. The water accumulated in this chamber will force both the power and reversing blades to the limit of their movement through the opposite side of the casing 10 so as to again change the direction of travel of the water to the other water chamber 13, whereupon, the action just described will be repeated. The valve 23 will hold the exhaust ports 12 in closed position until the particular chamber of the port so closed has been completely filled, that is, until the power and reversing blades have been forced to the limit of their movement toward the outer wall of the other chamber, whereupon the valve 23 will be operated to open the exhaust, the said opening being rapid so that the chamber just filled is quickly and completely exhausted. During the operation of the power blade 15, the shaft 16 is reciprocated and power from this shaft may be taken in any well known manner.

The invention is susceptible of various changes in its form, proportions and minor details of construction and the right is herein reserved to make such changes as properly fall within the scope of the appended claims.

Having described the invention what is claimed is:—

1. A water motor comprising a casing having separate water chamber, a power blade pivotally mounted within the casing between the water chambers, means for alternately directing the water into said chambers upon opposite sides of the power blade to operate the latter, a common inlet and a separate outlet for said chambers, a valve controlling the outlets and means connecting the valve with the water directing means for alternately opening and closing the outlets.

2. A water motor comprising a casing, a power shaft located centrally thereof, a power blade secured upon said shaft, a reversing blade having one end connected to the power blade, said blades dividing the casing into separate water chambers having a common inlet port located at one end of the casing adjacent the free end of the reversing blade, an exhaust port located at the opposite end of each of the water chambers and means controlled by the operation of the reversing blade for alternately opening and closing the exhaust ports.

3. A water motor comprising a casing, a power shaft located centrally thereof, a power blade secured upon said shaft, a reversing blade having one end connected to the power blade, said blades dividing the casing into separate water chambers having a common inlet port located at one end of the casing adjacent the free end of the reversing blade, an exhaust port located at the opposite end of each of the water chambers, a pivotally mounted valve capable of movement to close either of the exhaust ports and means connecting the valve and the reversing blade for alternately opening and closing the exhaust ports.

4. A water motor comprising a casing, a power shaft located centrally thereof, a power blade secured upon said shaft, a reversing blade having one end connected to the power blade, said blades dividing the casing into separate water chambers having a common inlet port located at one end of the casing adjacent the free end of the reversing blade, an exhaust port located at the opposite end of each of the water chambers, a pivotally mounted valve capable of movement to close either of the exhaust ports, a lever pivotally mounted upon each side of the casing, means for connecting one end of each of the levers with the valve and means for connecting the opposite ends of said levers with the reversing blade for alternately opening and closing the exhaust ports.

In testimony whereof we affix our signatures.

WALDO D. ROOT,
CLARENCE E. HELMICK.